Aug. 15, 1944.  S. LIPSIUS  2,355,919
COATING PROCESS
Filed Nov. 5, 1940  3 Sheets-Sheet 1
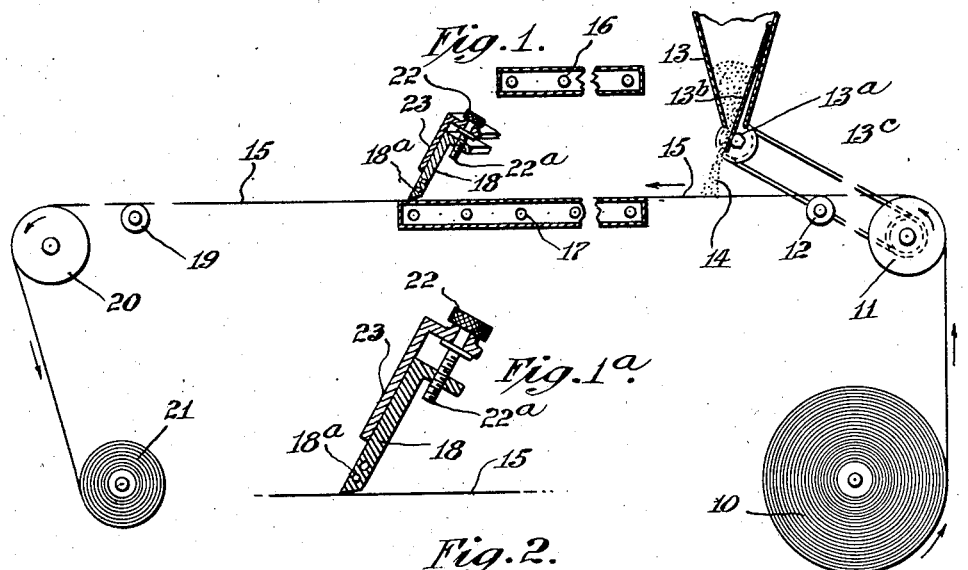
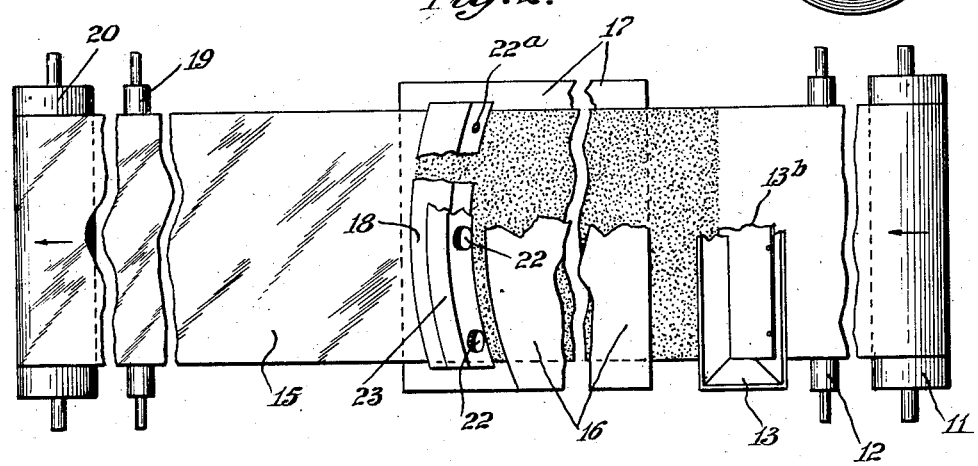
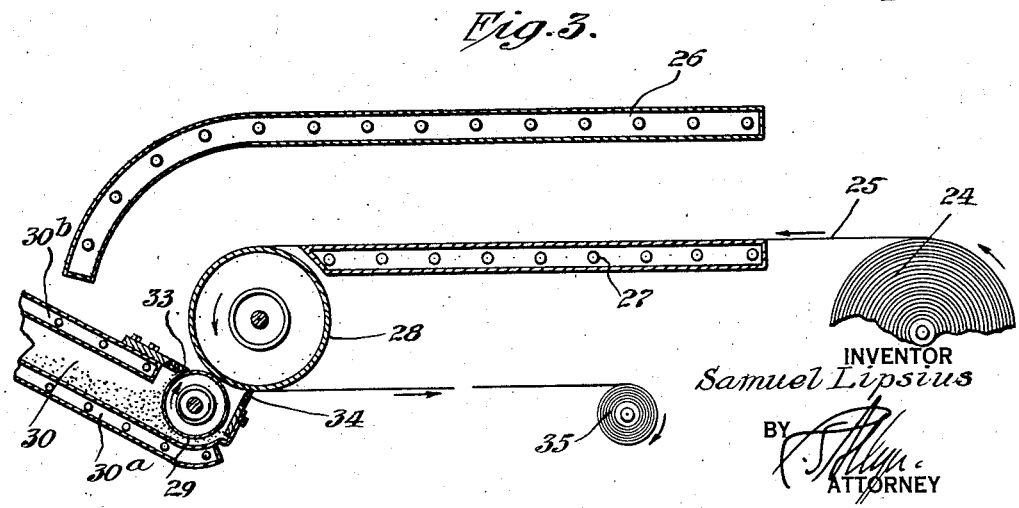
INVENTOR
Samuel Lipsius
BY
ATTORNEY Aug. 15, 1944.  S. LIPSIUS  2,355,919
COATING PROCESS
Filed Nov. 5, 1940  3 Sheets-Sheet 2
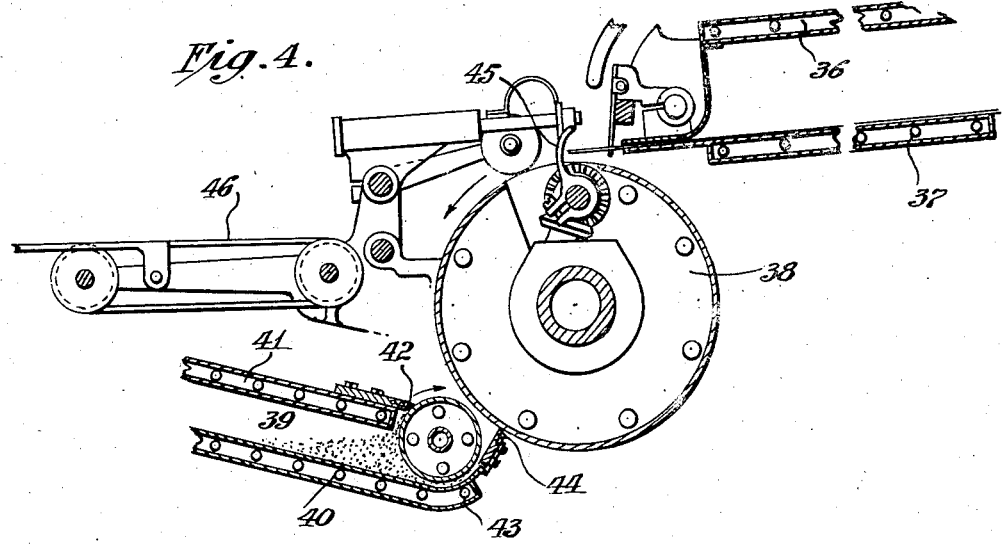
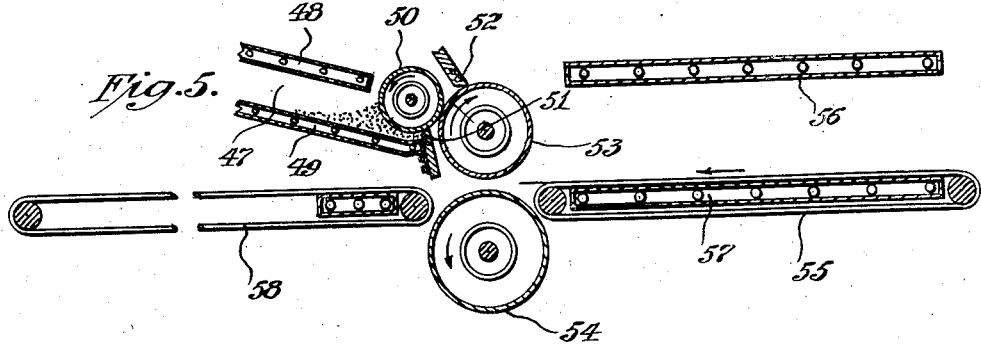
INVENTOR
Samuel Lipsius
BY
ATTORNEY Aug. 15, 1944.    S. LIPSIUS    2,355,919
COATING PROCESS
Filed Nov. 5, 1940    3 Sheets-Sheet 3

INVENTOR
Samuel Lipsius
BY
ATTORNEY

UNITED STATES PATENT OFFICE 2,355,919

COATING PROCESS

Samuel Lipsius, New York, N. Y.

Application November 5, 1940, Serial No. 364,389

18 Claims. (Cl. 117—132)

This invention relates to processes for coating paper and the like with what are known as varnish and lacquer type gums, resins or the like or compositions of such resins and gums, both natural and synthetic, in the form of hot melts.

An object is to provide processes for coating with practically any of the varnish or lacquer type gums or resins, both natural and synthetic, besides those especially manufactured for the purpose of hot melts.

A further object is to provide processes for coating with gums and resins such as copal, kauri, shellac, vinyl resins and the like heretofore considered not possible to use as hot melt coatings because of their high viscosity and tendency to discolor, polymerize or coagulate under heat.

A still further object is to provide processes for coating paper and the like with gum copal, gum kauri, shellac, and Vinylite resins in their commercial form as hot melt coatings without requiring mixture of these with other materials, so as to save the cost of manufacturing them into such special compositions, as such compositions containing other resins in reality weaken their natural hardness and flexibility and impair their good color.

Yet a further object of this invention is to make available processes for coating paper and the like with coating materials free from volatile solvents so that no drying machines will be necessary for evaporating such solvents, and thus save the cost of drying machines and solvents, and make for healthier and safer conditions for the operators than when liquid coatings such as those containing alcohol, toluol and similar solvents are used.

Heretofore varnish type resinous coatings have been applied in two general methods. One involves the use of volatile solvents. This is the most common but is objectionably expensive and disadvantageous in many ways including the cost of the solvents, the cost of driers, the time for drying, the problem of safety, and elimination of gaseous fumes. The other general class is hot melts. While preferable because of elimination of the volatile solvents, no satisfactory process and apparatus has been devised as well as no satisfactory coating composition for such use. If a natural resin like shellac or copal is used in the ordinary coating apparatus, it is not suitable because of the relatively high fusion points, the high viscosity, and the danger of discoloring and polymerizing the materials due to heating. The lower fusing resins offer no difficulty, but are not desirable for coatings because they become tacky, are not as hard, permanent, or colorless as is desired. Efforts have been made to mix resins in the hope of getting a satisfactory hot melt type coating material, but without success.

This invention relates principally to the so-called high fusion, high viscosity resins as shellac, copal, kauri, and the synthetic resins possessing these physical characteristics, such as vinyl resins known as vinylite, and others too numerous to mention.

One may have perfect mechanism for application of hot melts at low cost but if the coating material were to be too expensive, little saving over the cost of prior art means will result. So for hot melt coating to become a success, it must not cost any more than present liquid coatings, then the savings on the cost of solvents and drier will be a factor.

While special resinous compositions may prove their worth in special coating problems in spite of their higher cost, this invention has particularly to do with making available, as before stated, and for the reasons mentioned and explained, the lower cost natural resins or gums that have proven so successful in liquid form coatings, and the use of Vinylite resins which, because of their outstanding desirable characteristics, are suitable to replace the higher cost liquid lacquers so dangerous to use.

It is of the utmost importance that the coating be non-tacky under any and all weather conditions, especially on the hot days of summer. Also of course the coating must be transparent and have a hard flexible surface comparable with liquid coating results, as such work now done by liquid coatings averages 2,000 sheets per hour or more, consuming six to eight gallons of varnish per 1,000 sheets. Such speed of production means that these sheets are piled high, and though still warm as they emerge from the drying machines, must not stick together, especially when placed under pressure, or die cutting knives when cut into labels and the like.

From the above it can be seen that low fusing and low viscosity material that may pass during ordinary weather conditions, may become tacky on the hot days of summer. Copal, kauri and shellac are the outstanding varnish gums now used in liquid form because of their high fusion and softening point and unalterable, hard transparent surfaces. Vinylite lacquers though high in cost find great favor because of their water white transparency. These are also however the most troublesome gums to use in the form of hot melts because they can not be brought down by heat to a low viscosity by any known present means because of the tendency to discoloration, polymerization and coagulation. Yet they otherwise have the desirable characteristics as well as the low price necessary for a good hot melt coating.

Many other resins of lower fusion point also present problems for use as hot melts along similar lines, and the process and apparatus disclosed herein will handle such with greater ease.

Taking copal, kauri or shellac gums as an illustration, the main problem involved is how to reduce them by heat to a low enough viscosity so they can be applied as a hot melt coating. To place these gums, whether powdered, ground or in lumps, in a fountain and apply heat will only result, after heating and stirring, in a tough gummy mass. This will prevent its application in a thin film, or by such action stop the fountain's operation altogether. Continuous heating for as little as fifteen minutes will start discoloration and finally make the mass brownish in appearance and thus useless as a transparent paper coating. The continuous heating coagulates or polymerizes the mass and it becomes more and more discolored but is not reduced in viscosity.

In regular varnish making, not for coating paper, copal gum is ground, pulverized, masticated and put through other processes to make it finally more easily dissolved in solvents. In such treatment many chemicals and other resins are added and it is subjected to fusing temperatures as high as 260° C. Gum copal so treated is of course more expensive and has not been previously suitable to be used as a hot melt coating as it loses transparency, clear color and a great deal of its toughness of surface by the treatment mentioned.

A good quality of gum copal will become soft and start fusing at about 120° C. Gum kauri starts fusing at a little higher temperature. As these resins or gums are exudations of trees, hardened with age, and come from different sections of the world, they can not be depended on to be entirely uniform in fusion point, hardness and color. Sometimes copal, known as bled copal, or bled kauri and other grades become mixed with some fossil resins of the same nature and are sold as copal in bag lots. Some commercial copal contains quantities from different crops so that it is advisable to pulverize and grade it all to pass a 60 mesh sieve for example. This grinding or pulverizing tends to mix the different kinds of copal so as to produce a more uniform fusing copal. Shellac has a melting point of about 85° C., Vinylite resin series "A" 105° to 150° C.

In order to use powdered copal, kauri or shellac for the purpose of a hot melt coating for paper or similar foundation, it is necessary, as already pointed out, to guard against discoloration and polymerization brought about by prolonged heating. Vinylite can stand a great deal of heating. Several factors must be brought to bear and coordinated.

The stock or foundation to be coated should be made compatible by preheating to the temperature of the softening point of the gum or resin used.

The copal or other resin mentioned above is preferably powdered and kept below its full fusion or melting temperature until just before application or until the time of actual application to the foundation.

The body member or base upon which the sheet to be coated rests while being coated is heated to a temperature above the softening point of the gum or resin used.

The applying means such as a doctor blade is also heated to the fusion point of the gum or resin used. It can be seen that in this way the gum or resin is not brought down to its lowest point of viscosity and kept in such a low state of viscosity as would require a high temperature and result in discoloration. Instead the heat necessary for actual viscosity for coating is somewhat divided and made ready for instant action by the coordination of the elements mentioned above, each carrying its quota of heat until ready to act in unison to produce the desired result.

Referring to the drawings

Fig. 1 shows a conventional elevation of an apparatus embodying this invention and capable of using the process of this invention.

Fig. 1a is a detail of the smoothing blade shown in Fig. 1.

Fig. 2 is a top plan view of the device of Fig. 1.

Fig. 3 shows another embodiment of this invention.

Fig. 4 illustrates an apparatus for carrying out the process of this invention for coating separate sheets of paper or the like.

Fig. 5 is another embodiment of this invention wherein the apparatus illustrated is adapted for coating either paper or thicker material such as cardboard and the like.

Figure 6:
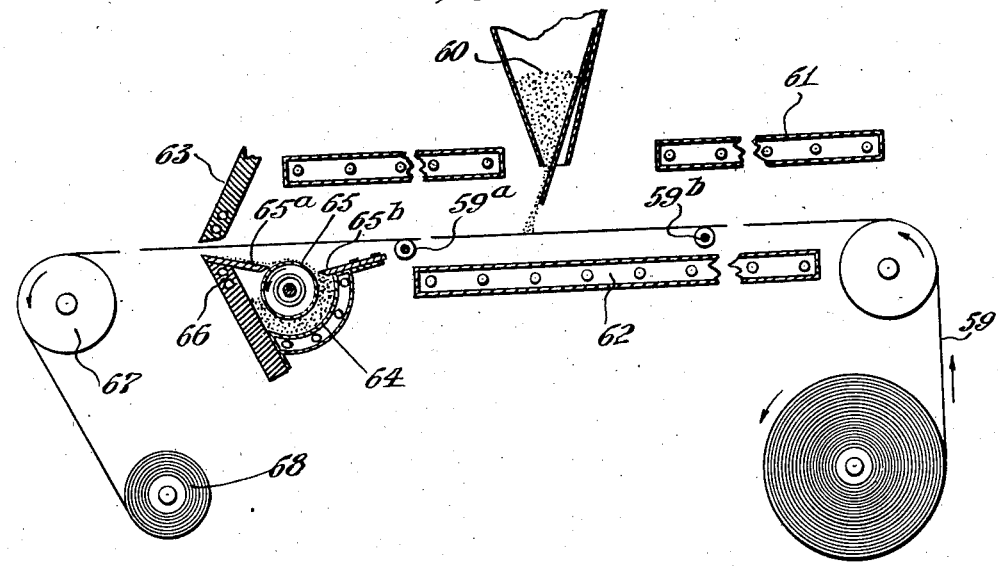
Fig. 6 shows another embodiment of this invention which is adapted for coating opposite sides of the paper at substantially the same time.

In Fig. 1 a supply roll 10 for a web or continuous strip of stock 15 supplies the paper or other foundation to be coated by this process and apparatus. The foundation web is fed in ways well known in the art over the rollers 11 and 12 to beneath the hopper 13 for powdering the surface of the foundation. Finely divided powder of the coating material, of about sixty (60) mesh, for example, is supplied to the hopper 13 and discharged therefrom by the vibrating side 13b which passes over a shaft 13a of polygonal cross section so that the vibration overcomes any tendency for the powder to clog in the hopper. The size of opening at the bottom of the hopper is proportioned with respect to the speed of the foundation so that the paper is coated with a thin layer of the powder particles close enough together so that when the particles are melted a continuous layer of a desired thickness may be formed. The shaft 13a is driven from any convenient source of power such for instance as the belt 13c operated by the shaft on which the roller 11 is mounted. The powdered material in the hopper may be any appropriate varnish type resinous material suitable for coating paper and the like. With the lower melt point resinous materials the particles of powder may be larger than with the higher fusion, high viscosity material. As previously stated the coating of paper with the low fusion resinous materials has not been difficult but the product is not satisfactory. Therefore this invention is intended principally for use with the natural and synthetic resins having melt points from about 65° C. to about 140° C.

Shellac, copal and kauri exemplify the types of natural resins found suitable and the particular type of vinyl resin hereinafter mentioned exemplifies one of numerous types of synthetic resins suitable for varnish type coatings which are hard, flexible, transparent and which strongly adhere to the foundation. After becoming coated with the powder particles the stock is passed between the upper and lower heaters 16 and 17 of such length and temperature correlated to the speed of the stock as to partially melt the powdered particles and heat the foundation to about the initial melting temperature before the material reaches the blade 18 which additionally heats and spreads the coating material uniformly over the surface of the stock while the material is in its lowest viscosity condition.

The coating material is preferably heated to a temperature just below its melt point, before it reaches the coating means, without the temperature being high enough to char the paper. With the thicker stocks it is necessary to heat both sides of the paper in order to get the heat into the paper sufficiently to avoid chilling the coating material. The blade 18 and table 17 as shown at 18a are heated to somewhat above the temperature of the coating material and are spaced to allow only the paper and the thickness of the coating desired to pass. Beneath the coating blade the paper rests on a substantially rigid heated foundation or table and the action of the blade may be likened somewhat to the action of a putty knife in spreading the coating material onto the paper. The paper is thus heated from top and bottom with the thin coating upon it under pressure contact which creates the maximum heat necessary for the lowest stage of viscosity of the resin used. As shown in Fig. 2 the blade 18 is curved so as to provide a tendency for any excess coating material to be kept on the paper rather than plowed off to the sides. The higher fusion coating material sets almost immediately so that as soon as the coated stock has passed the blade the coating will be found to have adhered securely to the foundation. After being coated the stock passes over the rolls 19 and 20 to the wind-up roll 21. For adjusting the height of the blade 18 screws 22a are provided with the knurled heads indicated. Guides are provided on each side of the blade 18 shown in Figs. 1 and 1a. The coating blade is also adjustable to allow more or less material to accumulate under it.

In order to protect the paper and coating from excess heat in event the paper is stopped, the heated table 17 is lowered quickly to a position well below the foundation. When the stock is not supported by the table 17 it will sag below the blade 18 and thus be out of contact with the heaters. The mechanism for lowering the table 17 may be operated manually or automatically in response to the stoppage of the machine. The sifter 13 is stopped in response to or with lowering of the table 17. The blade 18 is of substantial depth to provide enough additional heat for the coating operation.

In the embodiment shown in Fig. 3 the continuous web or foundation 25 is passed from the supply roll 24 between the heaters 26 and 27 which bring the stock up to an appropriate temperature for coating it between the rolls 28 and 29. Instead of the coating material being powdered over the surface of the paper, the coating material in Fig. 3 is supplied to an inclined possage 30 down which it may slide while being slightly heated by the upper and lower heaters 30b and 30a respectively. The rolls 28 and 29 are each heated preferably by some appropriate type stationary heater extending through the hollow shafts of these rolls. These rolls are heated to approximately the melting point of the coating material. The doctor blade 33 cooperating with the coating roll 29 is heated in any appropriate manner. After passing between the rolls 28 and 29 a heated coating blade 34 may be desirable to reduce thickness of the coating in some cases as it is still of the lowest viscosity at this point. As soon as the coated stock has passed the coating means the coating becomes chilled and adheres firmly to the foundation before being wound up on the roll 35. The inclination of the passage 30 should be sufficient for the material to flow down the incline by gravity. In the process illustrated in Fig. 3 the material fed need not be as finely divided as is desirable in the apparatus of Figs. 1 and 2 because it will be sufficiently melted when it reaches and is taken up by the coating roll. Some usual trip mechanism may be used to separate the rolls 28 and 29 whenever desired or at the beginning or end of a coating operation. The same type trip may also be used for separating the coating roll and work holder in Figs. 5 and 7. The heaters 30a and 30b are only sufficient to create a slide of the material down the incline if it tends to clog.

The coating roll 29 takes off or melts the partially fused material principally on the side contiguous the roll.

The apparatus shown in Fig. 4 is intended for coating separate sheets of paper which are intermittently fed between the heaters 36 and 37 to the work holding heated cylinder 38. This cylinder is provided with grippers 45 for carrying the paper around into contact with the coating roll 43 and thence delivering it onto the conveyor 46. The coating material is supplied to the inclined passage 39 as is the case with the substantially similar passage in Fig. 3, the coating material being more or less divided into particles to suit the conditions encountered. The coating material passes between the heaters 40 and 41 to the coating roll 43. Here again a heated doctor blade 42 controls the amount of coating material on the roll 43 and determines the thickness of the coat applied to the paper. The heated coating blade 44 is only brought into play if found necessary either to take off excess or for other reasons engages the coating after it has been applied to the paper and while coating is still in its lowest stage of viscosity. The usual trip mechanism found in a Kelly press for raising and lowering its cylinder will be found adapted for the purpose of automatically contacting the coating roll 43 and cylinder 38 and the inclined passage and coating roll etc. may be mounted in a cylinder type printing press in the manner specifically described in my U. S. Patent No. 2,319,242. It is understood that for larger and smaller sheets the packing on cylinder 38 is arranged accordingly as is well known in the prior art. In that way the coating material will not extend beyond the edge of the paper. To obtain the full benefit of the heat from the cylinder 38 being transmited to the paper, metallic packing, shaped to the size of the paper may be fastened to the cylinder in place of the ordinary felt packing used in the coating art.

In a process for coating with liquid varnishes, lacquers, etc., the coating machinery is manipulated to obtain the desired result, thinner or thicker varnishes are used on some stocks, more or less varnish is applied, more or less heat is used in evaporating the solvent, longer or shorter drying ovens are used, and conveyors with the coated stock are caused to run faster or slower through the drying machines, etc., all depending on the kind of stock used, and in coating with hot melts the same general rules apply. One stock will coat best with one kind of material than another, etc., room temperature, moisture content of stock, thickness, finish, etc. are factors, but give a hot melt coating operator the same amount of time to get experience as for liquid coatings, and the operation will prove as simple as with liquid coatings.

Any convenient type heating means may be used for the rolls, blades and stock. In each case the degree of heat applied will have to be correlated with the speed of operation and with the type of material used and also with the size of the particles of material supplied.

In Fig. 5 separate sheets of cardboard or metal and the like are intended to be coated. As previously described the coating material is fed down the incline 47 between the heaters 48 and 49 to the heated coating roll 50 which has a heated doctor blade 51 to control the thickness of the coating applied to the heated roll 53 having another heated doctor blade 52 cooperating therewith. The roll 54 is also heated so that there will be no opportunity for the coating to be chilled. The work to be coated is passed between heaters 56 and 57 which may extend to longitudinally overlap the rolls 53 and 54 on the conveyor 55. In Fig. 5 the roller 54 is adjustable up and down for any predetermined thickness of stock. When once set for a particular thickness of foundation, the rolls 53 and 54 remain apart when no sheet is passing. The heated doctor roll controls the thickness on the coating roll 53. The roll 54 constitutes a movable base upon which the foundation sheet rests while it is being coated. The rolls 53 and 54 are usually made smaller than shown and only a little larger than the doctor roll 50.

In the apparatus of Fig. 6 is shown means for coating both sides of a continuous web. The stock 59 comes from the supply roll and passes under the powdering reservoir 60 which is of the same construction as that illustrated in Fig. 1. Heaters 61 and 62 are provided above and below the work for heating the same to the desired temperature. The spreading blade 63 is analogous in function to the blade 18 in Fig. 1 and, of course, should be heated. There may or may not be an additional heater between the powder reservoir 60 and the blade 63 but in any event the powder in the reservoir should be kept free of the heat so that it will not be in danger of becoming melted in this powder container by proper insulation. The oppositely disposed coating distributing blades 63 and 66 function in this case as heated bases. Beneath the foundation is a heated supply tank 64 extending transversely of the moving stock, the coating material being moved inwardly of the work from opposite sides by gravity. Located within the heated receptacle 64 is a heated roll 65 that is preferably not in contact with the work. This roll 65 is for the purpose of raising the viscid material into contact with the heated doctor blade 65a which takes the coating material off the roll and thus enables the roll to push the coating material forwardly on the heated distributing blade 66 which applies the coating material to the underside of the paper. Another type of doctor blade 65b prevents excess material being raised by the roll 65 and enables just the desired amount to be fed to the distributing blade 66. The blades 63 and 66 are also made adjustable. It is simpler and easier to adjust blade 63 than blade 66 because if blade 66 is adjusted toward or from the paper it is necessary to move the receptacle 64, roll 65, and blade 65a with the blade 66 in order that these parts may maintain their same relative position. The rollers 59a and 59b act as supporting guides for the foundation to reduce its vibration before entering between the blades 63 and 66. The angles between the blades 63, 66 and the paper should be equal. In both Fig. 1 and Fig. 6 the spreading blades may be angularly adjusted, since with lower fusion and lower viscosity materials the angle with the paper need not be as large as with the higher melt point materials. In Fig. 6 the heated blades 63 and 66 may both be shifted away from the paper on stoppage of the machine. Preferably the same type of coating material is used for each side of the stock. Due to the very thin film that is needed for coating and the possibility of regulating the amount of heat necessary for the top and bottom coating blades, it will be found possible to coat both sides evenly or to have the coating at one side thicker than on the other and, if desired, or different coating materials may be used for each side. The receptacle 64 is preferably heated sufficiently to enable the coating material to be fed in by gravity.

The apparatus described in Figs. 1 to 5 is adapted for use with any of the coating materials mentioned and especially when the clearances around any coating roll or supply receptacle for the coating material are small enough so that theer is little or no danger of residual material collecting in such receptacle. However, with the apparatus in Fig. 6 where there may be danger of the coating material collecting in a pool in some part of the receptacle 64, it is preferable to use the Vinylite resins herein mentioned or similar character resins as the coating material since these resins do not become discolored or polymerized by heat to any substantial extent. After passing under the distributing blades 63 and 66, the foundation passes over the roll 67 and thence to the wind-up roll 68. The space under each distributing blade is considerably less than what has been illustrated since the usual coating applied to paper is extremely thin.

Figure 7:
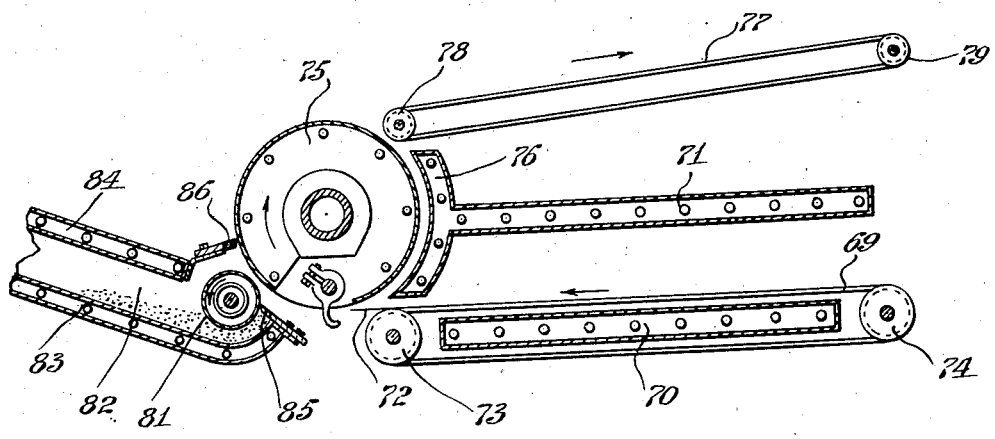
Fig. 7 shows another embodiment for coating sheets of paper or the like in an ordinary coating machine which has been converted for use with this invention.

In Fig. 7 is shown a common type of coating machine to which this invention has been applied. The conveyor 69 for feeding separate sheets of material to the work holding cylinder 75, passes around the rolls 73 and 74 and between the heaters 70 and 71 which heat a sheet of paper 72 or other foundation carried on the conveyor 69. The cylinder 75 is provided with the usual grippers which take the work sheet delivered by the conveyor 69 and hold it while being coated by the coating roll 81 and after being so coated the sheet is released from the grippers and delivered to the conveyor 77 which passes around the rolls 78 and 79. The inclined passage 82 is provided with heaters 83 and 84 similar to what has been shown and described in connection with Fig. 4 above. The coating material is taken up by the heated coating roll 81, the heated doctor blade 85 controlling the thickness of the film and the coating blade 86 serving for the purpose described for the blade 44 in Fig. 4. The apparatus of Figs. 4 and 7 is preferably regularly and automatically supplied by the work sheets so as to minimize the danger of overheating any of the coating material, in which case the relative separation of the cylinder 75 and the coating roll 81 is automatic in response to operation of the machine. If the work is fed manually, the separation of the cylinder and coating roll may be affected manually by the trip of the machine. In Figs. 3, 4, 5 and 7 the coating rolls may be driven by an auxiliary drive as described in my U. S. Patent No. 2,319,242, in event of the machine stopping so that the film on these rolls will be in less danger of being damaged by excess heat even though an automatic cut out for the heaters is provided. The automatic shut off for the heaters may be provided for all heaters in each embodiment illustrated in order that the heat supply may be shut off in response to stoppage of the machine.

For heating the foundation and outside sections of cylinder without unduly heating the environment of the machine it might be desirable to use infra-red heat lamps in each embodiment. Gas, steam or electric heat may be used for heating the rollers, etc. It is intended that all parts heated be thermostatically controlled as well as equipped with switches or the like for turning on and off any desired temperatures as with three heat switches.

In Fig. 1 it is intended that the coating material and foundation shall be heated gradually as they move toward the spreading blade to a temperature which is a maximum between the spreading blade and the heated base 17. That maximum should be not substantially more than enough to meld the material sufficiently to be uniformly spread over the foundation. In the embodiments using coating or doctor rolls, the material should preferably not be substantially melted in advance of contact with such roll, although the roll is heated enough to cause the coating to be melted and spread over its surface. Where heated doctor blades are used, heated doctor rolls may be used although the blades are preferred. With the lower fusion varnish resinous materials, the coating by hot melt operation may be so easy that it may not be necessary to heat the work holder at all or at least from outside only and it may also not be necessary to heat the underside of the stock at times especially with thin stock. The hopper illustrated in Figs. 1 and 6 is preferably of the type shown and described in Fig. 1 of my Patent 1,696,171 dated December 18, 1928, for Automatic powdering machine, or in Fig. 4 of my Patent 1,859,304 dated May 24, 1932, for Powdering apparatus, or in Fig. 5 of my Patent 1,929,200 dated October 3, 1933, for Powderer, though other types of hoppers and powdering devices may be used.

Although copal, kauri, shellac or Vinylite can not be reduced to a low viscosity by merely heating in the regular way, copal and kauri can be reduced to a low viscid mass for a short time only in the early stages of the heating described. Advantage is taken of this initial stage of viscosity or fusing period, in which stage for a few minutes, certain inherent oils or other materials contained in copal and kauri assert their solvent properties under the heat treatment and before evaporation of any elements whatever due to such heating and before any coagulation or polymerization has had a chance to set in, the coating operations are carried out as provided by the methods and apparatus disclosed.

At the above mentioned stage of viscosity of the thin film, such film is pressed against the heated foundation which is resting on a heated base, by the heated coating means which is preferably stationary, and the thin film is thus brought instantaneously to its lowest point of viscosity and is deposited as a liquid film on the foundation. This produces a high gloss of great beauty which sets hard immediately on leaving the coating means. Shellac because of its lower fusion point is less likely to coagulate and polymerize under a given time and amount of heating than copal or kauri. The quicker the process is carried out, however, the better and more transparent the film. Vinyl resins, known as "Vinylite," which is a trade-marked name of Carbide and Carbon Chemical Co., are related more closely to the polymerization group of resins than the condensation group since they do not change their chemical state when heated. They are commercially available in powder form. "Vinylite" resins are made in great variety by polymerization of various vinyl compounds under appropriate conditions. They may be hard or brittle resins depending on the varieties of vinyl compounds used as the raw materials. The type of vinyl resin or "Vinylite" which is most suitable for the purpose of this disclosure is what is known commercially as series "A," a polymerized vinyl acetate. But as the manufacture of vinyl resins is comparatively new, still more suitable vinyl resins may become available henceforth.

*Series A.*—Vinylite resins, because of their inherent thermoplastic property, do not fuse, but can be brought down to a sufficiently low softening point or viscosity to be applied as a coating under the above mentioned proper conditions.

There are three known commercial grades of series A, Vinylite resins known as

AYAA—having a heat sealing temperature of 105° C.
AYAF—having a heat sealing temperature of 130° C.
AYAT—having a heat sealing temperature of 150° C.

These resins are compatible with nitrocellulose, certain glycerol phthalate and phenol formaldehyde resins, and with fair amounts of shellac, dammar and ester gum, and therefore can be fused to form new coatings. But we are mostly concerned here with the possibility of using series A Vinylite resins as a hot melt without fusing them with any other resin in order to save the cost of such manufacture and to retain their wonderful water white color and extremely hard surface, as well as their odorless and non-toxic properties. Vinylite resin is much simpler to use as a hot melt if it is fused with a compatible resin such as a polyhydric alcohol ester of turpinene-maleic anhydride containing fatty acid, an alkyd resin known under the name of "Petrex," but as it loses some of its good qualities as mentioned above, it is preferable to use it by itself. Vinylite resins outside this range may be used. Other resins having fusion points generally within the ranges mentioned may be used if of a type appropriate for a varnish coating.

In operation, on web sheet with copal, for example, having a fusing temperature of about 125° C., first the rollers 10 and 21 are made ready for the coating operation by making the sheet continuous from roll to roll, or the web may come from a printing press.

The heat unit 17 is lowered and out of contact with the sheet to be coated. The heat is turned on to (1) Preheat stock.
(2) Heat coating blade.
(3) Heat base or work holder.

The thermostats are set for the desired temperature for each of above, about as follows:

|  | °C. |
|---|---|
| Stock | About 100 |
| Coating blade | 135 |
| Base | 135 |

As soon as these approximate temperatures have been attained as indicated by the thermostatic controls, the coating operation is ready to be started. The base heat unit 17 is raised to heat the stock by contact, and powder is turned on for slow speed operation. The powder starts to coat the sheet and as the powdered sheet reaches the coating blade 18 over heated base 17, it is melted down to the low viscosity necessary for the coating. While at this slow speed, adjustments are made for a smaller or greater fall of powder, for more or less heat at any desired point, and at the same time the speed is increased gradually to the capacity output for the work in hand. If for any reason a stop is desired, a lever is turned which lowers the heated base 17 out of contact with the sheet web 15 and stops the powder distributor simultaneously, as well as the operation of the rollers 10 and 21, or, if from a press, roller 21 and press.

If lower fusing coating materials are used, the heat is set accordingly, using the fusing temperature of the material as a guide and setting the coating blade and other parts at about the same temperature in proportion as shown for copal.

In single sheet operation practically the same idea is followed. Taking Fig. 7 for illustration, using shellac fusing at about 75° C. as the coating, the temperature of the foundation 72 is set at about 60° C., the coating roll 81 and coating blades 85 and 86 at about 85° C., the cylinder 75 at 85° C., heaters 71 and 76 and 70 at 70° C.

When the thermostats show the temperature has been reached, the operation is ready to start. The fountain having been loaded, the material slides down by gravity, due to the low heated side walls, and contacts the roller 81 which takes up a coating of the fused shellac and carries it toward the doctor blade 85 which allows only a predetermined size film to pass, and at the same time reduces the film to its low state of viscosity, due to its pressure against the heated coating roll. This coating roll now carries the thin film, spread over its surface, which is heated to 75° C. or 85° C., depending on the fusion point of the shellac used, and almost simultaneously transfers the film to the preheated stock which is resting against the heated cylinder and pressed against the cylinder momentarily by the coating roller. The heat at the point of this contact is thus stepped up, which insures perfect adhesion and a high gloss film. The stock now completely set is carried on upward and deposited on conveyor 77 hard and permanent. When no sheet is passing, the automatically fed fountain trips out of contact with the cylinder. If the coating machine is stopped, the fountain roller's operation is switched to the auxiliary drive provided. Heat is automatically shut off and can be started over again by turning the heat on to the proper temperature described. It is understood that all temperature figures are approximate. The operator can use the same tactics here by testing several sheets as is usual in liquid coating operations to obtain the desired results, depending on the stock used and the result desired, as for example, a very thin coating, a medium or heavy coating. After coating, the moisture content of paper may be brought back by passing the foundation over steam.

With these two illustrations, it is believed the other types of machinery shown in the drawings and operating on the same principle need no further explanation.

This invention is to be distinguished from the process of hot melt described by Pullman 2,070,553 or Miller 2,190,843. Each of these patentees contemplated mixing a high fusion resin with a lower fusion material in order to get a suitable low viscosity hot melt composition but as the lower fusion material functions as a solvent it is objectionable in that the resultant coating is not as hard and permanent as are the coatings of copal, kauri, shellac or Vinylite of applicant. Pullman recites polymerization troubles encountered with shellac which has a melting point of only 75° C. to 85° C. and difficulty in too high a viscosity with a mixture of shellac with ethylcellulose and many other materials. Pullman's Petrex resins are priced by the manufacturer at roughly twice the cost of the highest quality gum copal and the manufacturer has advised applicant they are no longer carrying such resins in stock for paper coating due to the lack of satisfactory apparatus for successful hot melt coating and the high cost of materials and the consequent lack of interest by paper converters.

This invention is also to be distinguished from the disclosure of Grupe 2,170,140 who discloses the usual heating bath or fountain wherein a bulk supply low fusion point material is heated to a liquid state for the production of carbon transfer paper. Grupe does not disclose any particular resinous materials and his process and apparatus would not be suitable for coating with the high fusion, high viscosity gloss varnish type resinous materials herein mentioned, because with a Grupe type fountain there would have to result objectionable overheating, and the higher fusion materials could not be rendered of sufficiently low viscosity for coating operations. Gloss varnish coating operations are done atop already printed or lithographed sheets, shortly after or as they come from the press face up, whereas Grupe's system would require the coating to be done face down. Grupe uses an intaglio roller mentioned in the claims which would not be suitable for hot melt varnish coating. In applicant's process, on the other hand, the coating materials do not have to be fully liquid in a fountain but are heat treated gradually and brought up to their lowest point of viscosity sufficient for coating operation only at the actual place and time of application to the foundation.

I am also aware of a patent granted to Weingand 1,988,099 for process of increasing the moisture proof qualities of sheets of organic matter. This process is intended for making moisture proof wrapping paper, etc., and the mixture of resins and waxes must be of such low viscosity or fluidity as to thoroughly impregnate the paper, and so that sheets of web may be run through a bath of the solution, or be used as a spray through spray guns or be put on by brushes, etc. and passed through drying or heating tunnels after coating to cause greater impregnation.

Applicant appears to have been the first to suggest the desirability of heating only a small portion of the resinous coating material at a time and as it is about to be consumed or used or applied to the paper or foundation. It is this gradual heating of only a small portion at a time and on up to the higher temperature at the time of actual coating that makes it possible to avoid overheating and thus discolorization, polymerization and all the other ills. Overheating necessarily is inherent in the use of an ordinary coating fountain or machine where a bulk supply of the coating material is heated and made liquid and then only a small portion of the heated liquid used at a time.

Of course the coating of both sides may be applied to piece work as well as to a continuous web. With metal, higher melting point resins may be used than is possible with paper. For paper this invention contemplates coating with any varnish type resinous material having a heat sealing character from 60° C. up to a temperature safely below that at which the paper chars. With metal these same coating materials may be used and in addition still higher heat sealing materials may be used. Other resins than those previously mentioned include the series V Vinylite resins obtained by the co-polymerizing of vinyl-acetate and vinyl-chloride which possess great chemical inertness, and which may be combined with oils, fats or waxes, either vegetable or mineral, to be made into a coating composition. Enough of such waxes etc. need be used to enable this series V Vinylite material to be suitable for coating. After coating with the series V Vinylite resin composition, high temperature baking may continue where the foundation permits it, with the result the coating may be rendered still less susceptible to solvents. When metal is coated with the series V Vinylite material the coated metal may be punched, spun, or drawn without injuring the coating. Certain types of thermosetting phenol-formaldehyde and urea-formaldehyde resins may be used in the form of molding powders capable of being manipulated under heat and pressure as described herein. Also some of the Rezyl resins, alkyd resins typical of the phthalic anhydride polyhydric alcohol class and containing saturated fatty acids, and made by American Cyanamid and Chemical Corp. having a fusion temperature of about 65° C. and upward may be found suitable for the process.

After the coating has been spread on the foundation the heating may be continued long enough to enable the coating to be covered by metallic or colored powders such as for bronzing, or covered by powdered abrasives, or by flocking, before the coating is set.

Having thus disclosed this invention, it will be understood that the appended claims are not to be limited to the particular materials, apparatus, and conditions herein specified.

I claim:

1. The method of coating a fibrous foundation with a hot melt varnish type resinous coating having a high viscosity, high fusion temperature and capable of forming a hard, flexible, glossy, transparent, permanent coating, which consists in applying a thin layer of powdered high viscosity resinous material on the top of a travelling foundation, gradually heating said foundation and layer of powdered material sufficiently to soften the material during a portion of its travel but without fusing it, subsequently momentarily applying superheat above the melting point to the top of the layer of material on the foundation along a narrow line extending transversely of the travelling foundation whereby said material is brought down to a low enough viscosity to be applied in a thin film and simultaneously scraping and pressing said material on the foundation in the form of a thin film and continuously moving the foundation away from said line of superheat and hardening the film.

2. The method of coating a fibrous foundation with a hot melt varnish type resinous coating having a high viscosity, high fusion temperature and capable of forming a hard, flexible, glossy, transparent, permanent coating, which consists in moving the foundation, preheating the foundation, applying a thin layer of powdered high viscosity resinous material to said travelling foundation, gradually heating said foundation and layer of powdered material to a temperature about 25° C. below the melting point to soften the material during a portion of its travel, subsequently and momentarily applying while the foundation and material are moving a flash of temperature above the melting point of the material to the layer of material along a restricted line extending substantially transversely of the travelling foundation whereby said material is melted and simultaneously pressing said melted material against the surface of said foundation in the form of a thin film and preventing the unmelted material from moving beyond said line of melting temperature and continuously moving the foundation with the film thereon away from said line and cooling the material.

3. The process of coating a fibrous foundation with a thin film of a resinous substance which comprises sprinkling a powdered resinous substance upon a moving sheet, heating the sheet and the substance at a temperature below that of liquefaction, passing the moving foundation and the resinous substance over a heated base and beneath a stationary heated spreader bar and simultaneously applying pressure and heat above its melting point to momentarily melt the resinous substance along a narrow line and form a thin glossy film upon the surface of the foundation and immediately cooling and hardening the film.

4. The method of coating paper with a hard, thin, glossy, transparent, flexible, highly viscous resinous substance from the group consisting of shellac, copal and a synthetic resin having similar physical characteristics which comprises heating the paper to about 15° C. below the melting point of the substance, heating the substance in powder form of approximately 60 mesh at a temperature somewhat below the melting point thereof without discoloration and then applying the heated substance to the heated paper at a temperature slightly above the melting point of the substance.

5. The method of providing a moving paper foundation with a thin, hard, glossy, transparent coating of a highly viscous resinous substance from the group consisting of shellac, copal and synthetic resins having similar physical characteristics which comprises depositing the resinous substance in a thin layer upon the moving foundation, heating the foundation and resinous substance to a temperature below the melting point of the resinous substance sufficiently to soften the same and then securing the resinous substance at a temperature at least as high as the melting point to the heated foundation in the form of a thin film by subjecting the foundation with the softened substance to pressure and a scraping action.

6. The method of providing a moving foundation with a hard, thin, glossy, colorless coating of a highly viscous resinous substance from the group consisting of shellac, copal and synthetic resins of a melting point between 75° C. and 140° C. and possessing substantially the same physical characteristics which comprises heating the foundation to about 25° C. below the melting point of the resinous substance, heating the resinous substance to a temperature between 15° C. and about 25° C. below its melting point and applying the heated substance in a thin layer to the heated foundation at a temperature about 10° C. above the melting point of the substance.

7. The method of providing a fibrous foundation with a hard, thin, colorless, transparent coating of a high viscosity resinous substance without any substantial amount of solvents and having a melt point between 70° C. and 140° C. which comprises moving the foundation, depositing the resinous substance in a thin layer to the moving foundation, heating the resinous substance and the foundation to a temperature high enough to soften the resinous substance but not to completely fuse or discolor it and then momentarily applying pressure and additional heat along a transverse line to the softened substance at a temperature at least as high as its melting point and simultaneously spreading the melted substance upon the moving foundation.

8. The method of coating paper with a thin, hard, colorless, transparent flexible film of a resinous substance having a melt point between 70° C. and 140° C. which comprises moving and heating the paper to a temperature slightly below the melting point of the substance, heating the substance in powdered form to a temperature somewhat below the melting point thereof to soften it without fusing or discoloring it and then momentarily heating the softened substance to a temperature about 10° C. above its melting point along a transverse line and at the same time spreading it on to the moving paper in a thin film.

9. The method of coating a foundation with a highly viscous resinous substance of the group consisting of shellac, copal and vinyl resins having similar physical characteristics with respect to high melt point and high viscosity which comprises applying the resinous substance in a thin layer to a moving foundation, applying heat to the foundation and to the resinous substance sufficient to soften without melting the resinous substance to avoid discoloring the substance and damaging the foundation and then momentarily applying heat to the resinous substance at a temperature at least as high as the melting point of the substance and simultaneously applying a scraping pressure to the melted resinous substance on the foundation whereby a hard, thin, colorless, glossy film is secured to the foundation.

10. The method of coating a foundation with a thin, colorless, transparent film of a high melt high viscosity plastic which comprises applying the plastic to a moving foundation, heating the foundation to a temperature below the melting point of the plastic but high enough to prevent chilling the melted plastic, heating the plastic to a temperature sufficient to soften but not to melt or discolor it and then securing the softened plastic to the foundation at a temperature momentarily above the melting point and at the same time momentarily applying pressure to the melting plastic so as to fuse it completely without discoloration.

11. The method of coating each of a succession of sheets of a paper foundation with a thin, hard, glossy, transparent coating of a highly viscous resinous substance which comprises heating the paper to a point below the melting point of the resinous substance, heating the resinous substance sufficient to soften but not to melt it, and then applying momentarily superheat and pressure sufficient to fuse and apply the melted resinous substance along successive narrow areas as the paper moves along.

12. The method of coating paper with shellac which comprises heating the paper to about 15° C. below the melting point of the shellac, heating the shellac in powdered form to about 15° C. below the melting point thereof to soften same and then applying the softened shellac to the heated paper at a temperature at least as high as the melting point of the shellac.

13. The method of coating paper with copal which comprises heating the paper to about 25° C. below the melting point of the copal, heating the copal to about 25° C. below the melting point thereof to soften it and then applying the softened copal to the heated paper at a temperature at least as high as the melting point of the copal.

14. The method of coating each one of a succession of sheets of paper with a hard, thin, glossy, transparent, flexible, highly viscous coating substance melting between 65° C. and 140° C. and softening below its melting point which comprises heating each sheet to about 15° C. below the melting point of the substance, heating the substance at a temperature below the melting point thereof to soften it and then further heating the softened substance at a temperature of at least the melting point of the substance and then applying a scraping pressure so as to spread the melted substance onto the sheet.

15. The method of providing a paper foundation with a thin, hard, glossy, transparent coating of a highly viscous resinous substance from the group consisting of shellac, copal and a synthetic resin of the same physical characteristics which comprises moving the paper foundation, depositing the resinous substance in powdered form upon the moving foundation, heating the foundation and resinous substance to a temperature between about 15° C. and about 25° C. below the melting point of the resinous substance and then successively heating consecutive small portions of the resinous substance at a temperature at least as high as the melting point of the substance to melt the same and simultaneously applying said melted substance to the foundation as it moves along.

16. The method of coating each one of a succession of sheets of paper with a hard, thin, glossy, transparent, flexible, highly viscous alkyd resinous substance comprising an esterification product of a polyhydric alcohol and a dibasic acid anhydride taken from the group consisting of phthalic anhydride and turpinene-maleic anhydride, which method comprises heating each sheet to about 15° C. below the melting point of the substance, heating the substance at a temperature below the melting point thereof to soften it and then further heating the softened substance at a temperature of at least the melting point of the substance momentarily and then applying a scraping pressure so as to spread the melted substance onto the sheet.

17. The method of coating metallic foundations with a hot melt coating of resinous material, having a melting point between about 65° C. and 140° C.; said method comprising applying the material in small portions to the foundation to form a thin layer thereon; subsequently applying momentary superheat at a temperature at least as high as the melting point of the material to the material to fuse the material; and immediately applying pressure to the fused material on the foundation along a line substantially in the plane of the surface of the foundation and in a direction substantially parallel to the surface of the foundation, to spread the material over the surface of the foundation.

18. The method of coating foundations with hot melt materials having a melting point between about 65° C. and 140° C. which comprises moving the foundations, preheating the foundations, applying a thin layer of material to the foundation, gradually further heating the foundation to partially melt the coating material, subsequently and momentarily applying while the foundation and material are moving, superheat above the melting point of the material along a restricted line extending substantially transversely, of the traveling foundation whereby said material is melted and simultaneously pressing said melted material against the surface of said foundation in the form of a thin film and preventing the unmelted material from moving beyond said line of melting temperature and continuously moving the foundation with the film thereon away from said line and cooling the material.

SAMUEL LIPSIUS.